3,468,919
PROCESS FOR THE PRODUCTION OF
N,N-DIALKYLAMIDES
John R. Kilsheimer, Westfield, and Ross A. Kremer, Bell Mead, N.J., assignors to Mobil Oil Corporation, a corporation of New York
No Drawing. Filed Aug. 10, 1966, Ser. No. 571,421
Int. Cl. C11c 3/00; C07c 103/20
U.S. Cl. 260—404
13 Claims

ABSTRACT OF THE DISCLOSURE

A method for the preparation of N,N-dialkylamides which comprises contacting an organic acid in vaporized mixture with a dialkylamine in the presence of an orthoaluminum phosphate catalyst.

---

This invention relates to the preparation of N,N-dialkylamides and more particularly to a catalytic process for preparing N,N-dialkylamides by the vapor phase reaction of an organic acid with a dialkylamine.

In the past, N,N-dialkylamides have been prepared by liquid phase processes for the amidation of organic acids, e.g. as disclosed in U.S. Patent No. 2,667,511. However, the amide products of such liquid phase processes form azeotropes with the organic acid starting materials, making product purification difficult and expensive. U.S. Patent No. 3,006,956 discloses a liquid phase process by which the amidation of lower aliphatic acids can be accomplished with formation of a smaller amount of the azeotrope, but that process has the disadvantage of requiring pressures in excess of 900 pounds per square inch.

Dialkylamides have also been prepared by catalytic vapor-phase processes such as those described in U.S. Patent Nos. 2,932,665, 3,015,674 and 3,198,831. However, to provide high N,N-dialkylamide yields with suitably high conversion, those processes must be carried out with catalyst contact times that are too long for practical commercial use.

Accordingly, a catalytic process by which N,N-dialkylamides can be synthesized in high yields, with high conversion, and with a commercially practical contact time is very desirable, and it is an object of this invention to provide such a process.

In general, the present invention provides a process for preparing an N,N-dialkylamide by reacting an organic acid and a dialkylamine in vapor phase and in the presence of an orthoaluminum phosphate catalyst. In contrast with the results obtained by use of the aforementioned prior art processes, it has been found that N,N-dialkylamides can be produced in high yield and with an unexpectedly short contact time by use of an orthoaluminum phosphate catalyst in accordance with the process of this invention.

The organic acids that can be reacted in accordance with the process of this invention include any organic acid which, when reacted with a dialkylamine, will provide a desired N-N-dialkylamide product. Preferably, the invention is carried out with the use of a carboxylic acid such as formic acid or an aliphatic or aromatic carboxylic acid. Thus, the acid that is reacted in accordance with the present process can be, for example, an alkanoic acid such as acetic, propionic, isobutyric, tert-hexanoic, nonanoic, neodecanoic, or dodecanoic acid; an aromatic acid such as benzoic or naphthoic acid; an alkyl-substituted aromatic acid such as m-toluic or mesitylenic acid; or an aryl-substituted alkanoic acid such as benzylpentanoic or dibenzylacetic acid. Especially preferred for such use are carboxylic acids containing from 1 to 12 carbon atoms.

The amines that can be reacted with such an organic acid in accordance with the present invention include any dialkylamine which, when reacted with such an acid, will provide a desired N,N-dialkylamine product. Amines that are most conveniently employed in the process of this invention are typified by dimethylamine, diethylamine, dipropylamine, diisopropylamine, dibutylamine, di-t-hexylamine, diheptylamine, dioctylamine, etc. Generally preferred for such use are dialkylamines in which each alkyl group contains from 1 to 8 carbon atoms.

Thus, in a preferred embodiment, the invention provides a process for the preparation of an N,N-dialkylamide having the formula

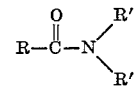

in which R is hydrogen or a hydrocarbyl group containing 1 to 12 carbon atoms and R′ is an alkyl group containing 1 to 8 carbon atoms, which process comprises contacting a vaporized mixture of a dialkylamine having 1 to 8 carbon atoms in each alkyl group and an organic acid having the formula

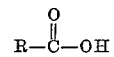

in which R has the aforedescribed significance, with a catalytic amount of orthoaluminum phosphate.

The utility of the process of this invention is particularly exemplified by an embodiment thereof in which N,N-diethyl-m-toluamide (a well-known insect repellent) is prepared by contacting a vaporized mixture of m-toluic acid and diethylamine with a catalytic amount of orthoaluminum phosphate. Other N,N-dialkylamides that can be prepared by the process of this invention include, for example, dimethylformamide, diethylacetamide, dibutylacetamide, dioctylisobutyramide, diisopropylhexanamide, di-t-butyldodecanamide, dipropylbenzamide, didipentylnaphthamide, dihexyl-p-toluamide, diheptylbenzylacetamide, etc.

Although the dialkylamide products of this process are produced by reaction of an organic acid and a dialkylamine in a molar ratio of one to one, the acid and amine can be present in any desired proportions in the vaporized mixture that is contacted with an orthoaluminum phosphate catalyst in accordance with this invention. Superior results are usually obtained if the amine is present in a ratio of at least one mole per mole of the organic acid. In general, the reactants are advantageously present in a ratio of from about 1 to about 4, and preferably from about 1 to about 2 moles of the alkylamine per mole of the organic acid.

As aforesaid, the catalyst that is utilized in the process of this invention is orthoaluminum phosphate ($AlPO_4$), which is commercially available. It can be prepared, if desired, by heating aluminum orthophosphate hydrate ($Al(OH)_2H_2PO_4$) to a suitable dehydration temperature (generally below 320° F.) or by reacting aluminum hydroxide with phosphoric acid. The catalyst can be employed in the process of this invention in any amount that is sufficient to increase the rate of reaction of a specific organic acid and dialkylamine. Preferably, the catalyst is utilized in the form of small particles, for example pellets having a diameter such as ⅛ inch, in order to insure that the catalyst is intimately contacted with the acid and amine reactants.

The process of this invention can be carried out at any temperature and pressure at which the dialkylamine and organic acid reactants are in vapor phase. Atmospheric pressures can be employed if desired. In general, suitable reaction temperatures are at least high enough for vaporization of the specific amine and acid reactants at the desired reaction pressure, and low enough to avoid substantial thermal decomposition of the dialkylamide product. For operation at or near atmospheric pressure, and depending on the specific reactants involved, reaction temperatures between about 250° and 450° C. are usually preferred.

As aforesaid, it is an important advantage of the process of this invention that N,N-dialkylamides can be produced by catalytic contact of the reactants for a time that is significantly shorter than the contact times required in the prior art processes. At temperatures in the aforementioned range, the process of this invention generally provides high reactant conversion and a high yield of the desired amide product with use of a contact time of about 5 seconds or less. Longer contact times can be employed and may be desirable, for example at relatively low reaction temperatures, since the required contact time for a given conversion and yield normally varies inversely with the reaction temperature. However, best results are usually obtained by contacting the vaporized mixture of organic acid and dialkylamine reactants with an orthoaluminum phosphate catalyst for from about 0.5 to about 5 seconds at a temperature in the range of 250–450° C. Within such ranges of reaction temperatures and contact times and in general, short-chain, straight-chain and low molecular weight organic acids are converted to their respective amidation products under somewhat milder conditions (e.g. lower temperatures and/or shorter contact times) than are otherwise-similar acids having longer chains, branched chains and/or higher molecular weights.

The following examples are included to illustrate procedures by which the process of this invention can be carried out to prepare N,N-dialkylamides by a vapor-phase reaction of an organic acid and a dialkylamine in the presence of an orthoaluminum phosphate catalyst, and should not be regarded as representing limitations of the manner of carrying out the process claimed herein, as those skilled in the art will readily understand.

Example I

A vaporized mixture containing dimethylamine and decanoic acid in a ratio of 2 moles of amine per mole of acid was passed upward at approximately atmospheric pressure through a 24″ x ¾″ Vycor reactor packed in the central 3 inches of its length with 20 grams of ⅛″ cylindrical pellets of orthoaluminum phosphate catalyst, and in the remainder of its length with inert Alundum balls. The catalyst bed was maintained at 355° C. and the vaporized mixture was in contact with the catalyst for one second. After condensation of the effluent from the upper end of the reactor, infra-red and vapor-phase chromatographic analyses showed that substantially 100% of the decanoic acid in the mixture fed to the reactor had been converted to N,N-dimethyldecanamide.

Example II

When the procedure of Example I was repeated with the exception that the organic acid in the reaction mixture was acetic acid, the catalyst bed temperature was 300° C. and the vaporized mixture was in contact with the catalyst for two seconds, infra-red and vapor phase chromatographic analyses of the product showed that substantially 100% of the acetic acid in the mixture fed to the reactor had been converted to N,N-dimethylacetamide.

Example III

When the procedure of Example II was repeated with the exception that the vaporized mixture fed to the reactor contained dimethylamine, benzoic acid and xylene (present as a solvent for the benzoic acid) in molar proportions of 2 to 1 to 11.5, respectively, and the catalyst bed temperature was 312° C., infra-red and vapor phase chromatographic analyses showed that 90% of the benzoic acid in the mixture fed to the reactor had been converted to N,N-dimethylbenzamide.

Example IV

When the procedure of Example I was repeated with the exception that the organic acid in the vaporized reaction mixture was neodecanoic acid (2,2-dimethyloctanoic acid), the catalyst temperature was 405° C. and the vaporized mixture was in contact with the catalyst for four seconds, infra-red and vapor phase chromatographic analyses showed that substantially 100% of the neodecanoic acid in the mixture fed to the reactor had been converted to N,N-dimethylneodecanamide.

Although the process of this invention has been illustrated with preferred embodiments, it is to be understood that modifications and variations may be employed without departing from the spirit and scope of this invention, as those skilled in the art will readily understand. Such variations and modifications are therefore considered to be within the purview and scope of the appended claims.

We claim:

1. A process for the preparation of an N,N-dialkylamide which comprises contacting a mixture of an organic carboxylic acid, comprising a member selected from the group consisting of an alkanoic acid, an aromatic acid, an alkyl-substituted aromatic acid, and an aryl-substituted alkanoic acid, with a dialkylamine, in the vapor phase, with a catalytic amount of orthoaluminum phosphate catalyst at a temperature sufficient to maintain the vapor phase of said mixture but below the decomposition temperature of the N,N-dialkylamide product.

2. A process, as defined in claim 1, in which the organic acid is acetic acid.

3. A process, as defined in claim 1, in which the organic acid is decanoic acid.

4. A process, as defined in claim 1, in which the organic acid is neodecanoic acid.

5. A process, as defined in claim 1, in which the organic acid is benzoic acid.

6. A process, as defined in claim 1, in which each alkyl group of the dialkylamine contains 1 to 8 carbon atoms.

7. A process, as defined in claim 9, in which the dialkylamine is dimethylamine.

8. A process, as defined in claim 1, in which the organic acid is m-toluic acid and the dialkylamine is diethylamine.

9. A process, as defined in claim 1, in which the vaporized mixture is contacted with the orthoaluminum phosphate catalyst for up to about five seconds.

10. A process, as defined in claim 1, in which the organic acid and dialkylamine are initially present in the vaporized mixture in a ratio of from about 1 to about 4 moles of the amine per mole of the acid.

11. A process, as defined in claim 1, in which the contact between the vaporized mixture and the orthoaluminum phosphate catalyst is caried out at a temperature between about 250° and about 450° C.

12. A process, as defined in claim 1, in which the contact between the vaporized mixture and the orthoaluminum phosphate catalyst is carried out at approximately atmospheric pressure.

13. A method in accordance with claim 1 in which the dialkylamine has from 1 to 8 carbon atoms in each alkyl group, and the vaporized mixture is contacted with said catalyst for a period of up to about 5 seconds at a reaction temperature between about 250 and about 450° C.

References Cited

UNITED STATES PATENTS 3,414,614  1968  Julia _____ 260—558

HENRY R. JILES, Primary Examiner

HARRY I. MONTZ, Assistant Examiner

U.S. Cl. X.R.

260—413, 558, 561

PO 1050
(5/69)

UNITED STATES PATENT OFFICE
CERTIFICATE OF CORRECTION

Patent No. 3,468,919　　　　　　Dated September 23, 1969

Inventor(s) John R. Kilsheimer and Ross A. Kremer

It is certified that error appears in the above-identified patent and that said Letters Patent are hereby corrected as shown below:

Column 4, line 64, the claim reference numeral "9" should read --6--.

SIGNED AND
SEALED

JUN 30 1970

(SEAL)
Attest:

Edward M. Fletcher, Jr.
Attesting Officer

WILLIAM E. SCHUYLER, JR.
Commissioner of Patents